June 22, 1937.　　　　F. O. COLE　　　　2,084,628
CIRCUIT CONTROLLING APPARATUS
Filed March 13, 1935　　2 Sheets-Sheet 1

Inventor
Frank O. Cole
By Strauch & Hoffman
Attorneys

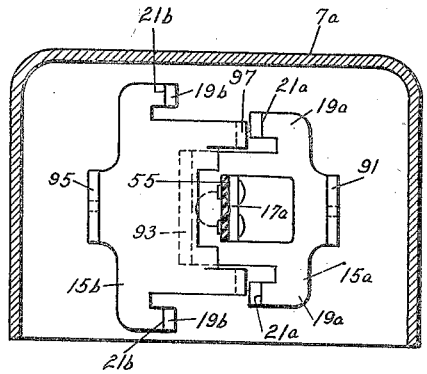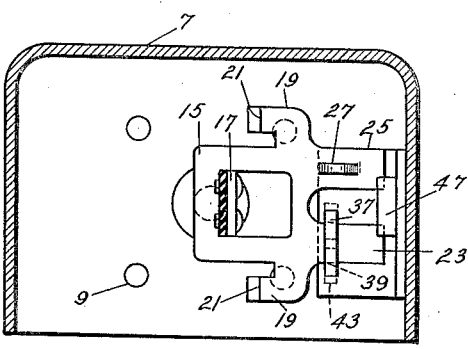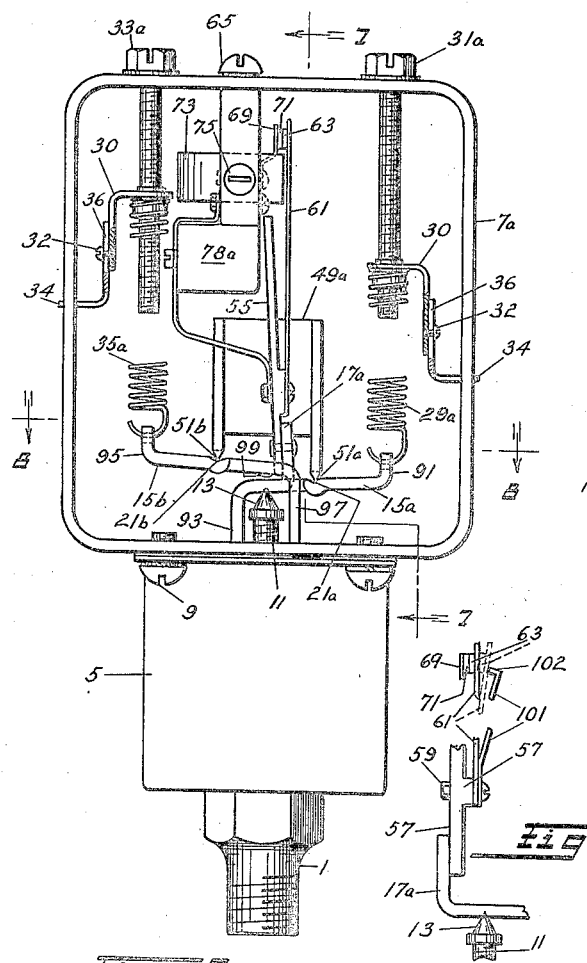

Patented June 22, 1937

2,084,628

UNITED STATES PATENT OFFICE 2,084,628

CIRCUIT CONTROLLING APPARATUS

Frank O. Cole, Detroit, Mich., assignor, by mesne assignments, to Timken-Detroit Axle Company, a corporation of Ohio Application March 13, 1935, Serial No. 10,958

4 Claims. (Cl. 200—83)

This invention relates in general to pressure or temperature controlled devices for making and breaking electric circuits, and is concerned in particular with devices incorporating an electric switch, operated by a mechanism which is sensitive to variations in pressure.

This invention comprises a pressure control device which, for purposes of convenience, will be discussed in connection with an automatic steam pressure heating system. It is to be understood, however, that the invention is not restricted to this use, but may also be used in connection with any apparatus in which it is desirable to control pressure or temperature.

Each of the numerous controls of an automatic home heating system must be very inexpensive to manufacture, must be positive in action and must be very sensitive without being fragile or delicate. The general object of this invention is to produce a device having these desirable properties.

The boiler pressure control of an automatic heating system should be so designed that it will be subordinate to the room thermostat. The reason for this is that the object of such a system is to maintain a uniform room temperature, and in order to do this it is necessary that the room thermostat have full control under ordinary conditions. It has been found that a pressure control with an adjustable pressure differential is desirable to obtain this subordination because different types of steam systems, as well as different houses, require different pressure differentials.

The province of a pressure control device is to control the steam pressure between certain minimum and maximum limits. The minimums and maximums vary with the installation. It is necessary to prevent too high pressures as such pressures subject the system to excessive strains and reduce the efficiency of the systems.

It is accordingly an object of this invention to provide a novel control device which will maintain accurately the pressure in a boiler or the like between certain desired limits.

Where a fixed steam pressure difference varying from two to six pounds was generally accepted a year ago, today the demand of modern heating equipment has made necessary an adjustable differential of from one to eight pounds to meet the requirements of various types of installations. Many prior art devices are not capable of meeting this demand for the reason that the differential in certain of such prior devices is not adjustable, and others, which have an adjustable differential, are either so complicated that their cost is prohibitive or positive action thereof is not continuously achieved because they are too fragile to stand up under the requirement called for in practical use.

Therefore, it is a further important object of this invention to provide a control device having a novel actuating mechanism which is extremely simple, rugged in design, economical to manufacture, and provides a ready differential adjustment.

It is a further object of this invention to provide a control device having a mechanism which is sensitive and positive in operation, and accurately adjustable to the required maximum and differential pressures without being fragile or delicate.

Automatic steam heating systems comprise three essentials: (1) the heating mechanism; (2) the steam boiler and system, and (3) the control system. The heating mechanism is generally an electrically controlled oil burner or coal stoker and blower, so that the various devices of the control system operate to interrupt or close an electric circuit as required. Prior art devices are further inadequate to provide today's adjustable pressure differential because of short-comings of their electric circuit make and break mechanisms. The requirements of a make and break mechanism, suitable for use in apparatus of today, are that it shall be sensitive without being fragile, and that its closing and opening action shall be abrupt and yet positive or, in other words, that it shall snap into and out of contact.

It is, therefore, a further object of this invention to provide for use in a pressure control device, novel electric switch mechanism which will operate satisfactorily under an adjustable differential. More specifically in this connection, it is an object to provide an electric switch mechanism which is sensitive without being fragile and which will produce a positive and abrupt make and break action.

A further object is to provide for use in a pressure control device a novel unitary pressure responsive mechanism and an electric switch mechanism, the combination of which produces positive and trouble-free action whereby an adjustable pressure differential may be accurately established and maintained.

Further objects of this invention will become apparent as the specification proceeds in connection with the accompanying drawings, and from the appended claims.

In the drawings:

Figure 5 is a sectional view taken substantially along the line 5—5 of Figure 1, as viewed in the direction of the arrows;

Figure 6 is a front elevational view similar to Figure 1, but it illustrates a modification of my invention;

Figure 7 is a sectional view taken substantially along the line 7—7 of Figure 6;

Figure 8 is a sectional view taken substantially along the line 8—8 of Figure 6, and Figure 9 is a fragmental view of a modified form of contactor blade assembly illustrated as being applied to the first form of my invention.

Figure 1:
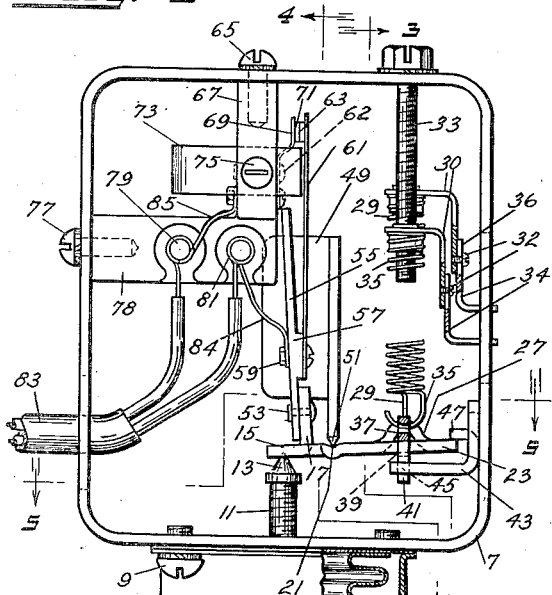
Figure 1 is a front elevational view, with the cover removed, of a control device incorporating my invention and showing parts of the control mechanism and the operating bellows partially in section.
Figure 2:
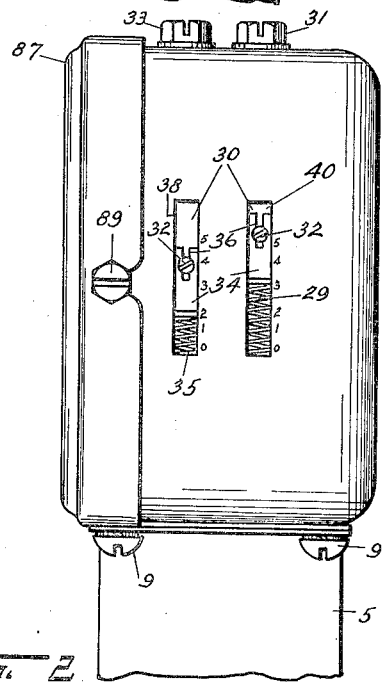
Figure 2 is a side elevational view of the device illustrated in Figure 1 as it appears when viewed from the righthand side of that figure with the cover in place.

Referring now to the drawings, wherein like reference numerals refer to like parts wherever they occur, and with particular reference to Figure 1, reference numeral 1 indicates a screw-threaded fitting adapted to be directly connected, or by means of suitable piping to a pressure chamber. Fitting 1 has a pressure tight connection (not shown) with the interior of a casing 5 which contains a corrugated bellows 3. Casing 5 is attached to casing or box 7 by suitable means such as cap screws 9. Adjustably connected to bellows 3 is an actuating pin 11, which has on its upper extremity a conical surface 13 terminating in a point. The point of conical surface 13 is adapted to seat and fulcrum in a depression provided therefor in one end of pressure plate or lever 15.

Pressure plate 15, as may best be seen in Figure 5, is of a peculiar shape. It may be made of any suitable material, but it is preferably formed from a flat sheet of metal, and is stamped or perforated so that in its finished state it has an upturned tongue 17 in its midportion; opposite lugs 19 at its sides having creases 21 therein; and two adjacent fingers 23 and 25 at its ends. Finger 25 has a slitted portion which is pressed upwardly out of its plane so as to form a loop or eye 27. Eye 27 is adapted to receive one end of a spring 29, the other end of which is adjustably secured to an adjusting screw 31. Screw 31 is rotatably received in the upper side of box 7 and is provided with a slotted hexagonal head to facilitate turning it. Adjacent adjusting screw 31, and also journaled in the top of box 7, is a second adjusting screw 33, to which is attached one end of a second spring 35, the other end of which is inserted through a hole in a link 37, to be described hereinafter.

Each of springs 29 and 35 has secured at its upper end an interiorly screw-threaded member 30 adapted to be threaded onto adjusting screws 31 and 33, thereby providing the means by which the tension on the springs is controlled. Each of members 30 is provided with an outwardly and downwardly depending angular strip-like portion which has in its lower portion a threaded aperture for the insertion of a set screw 32. Set screw 32 adjustably secures to member 30 a complemental strip-like angular member 34, which has in one end thereof a longitudinal slot 36, whereby members 30 and 34 may be vertically adjusted in relation to each other. The lower portion of each member 34 is bent so that they project through vertical slots 38 and 40 provided therefor in the side of box 7. On the outside of box 7, and adjacent each slot a vertical row of numbers are stamped or embossed to indicate pounds of pressure. The relation of members 34 to members 30 is so adjusted that the protruding portions of members 34 will register with the proper numeral for a given pressure condition. The device is therefore calibrated by placing bellows 3 under predetermined pressures and loosening screws 32 so as to secure the proper relationship between members 30 and 34. Although I prefer to adjust the device in this manner, it is to be understood that if desired members 30 and 34 may be integrally formed and the pressure numerals provided on vertically adjustable plates secured to casing 7.

Link 37 comprises a flat sheet of metal substantially rectangular in shape, having a rectangular opening 39 in its center portion and oppositely extending ears 41 at its lower portion. Aperture 39 is of such size that finger 23 of lever 15 may be inserted therethrough and leave a certain amount of clearance in a vertical direction, and the function thereof will be pointed out hereinafter.

Attached to the wall of box 7 adjacent the fingers 23 and 25 of lever 15 is a bracket 43, which may also be made from a flat sheet of metal. Bracket 43 is angular in shape, having a horizontally extending portion which is provided with an aperture 45 to receive link 37. Aperture 45 is of such size that ears 41 of link 37 will prevent the link from passing entirely therethrough. The attached portion of bracket 43 has struck outwardly at right angles thereto, a lip or stop 47, which is of such width that when the parts are in assembled relation, and there is no pressure in the device, it will contact both fingers 23 and 25. Lip 47 accordingly limits movement of the parts under the influence of springs 29 and 35.

Secured to the back wall of box 7 is a right angle bracket 49 having on its lower surface two spaced knife-edged pivots 51, which are designed to register with creases 21 of lugs 19. Plate 15 therefore fulcrums or rocks about knife-edges 51 as an axis, and when there is no pressure in the bellows, spring 29 will hold plate 15 in engagement with knife-edges 51 and lip 47, as shown in Figure 1. Spring 35 will maintain link 37 with its ears 41 in engagement with the underside of bracket 43 under these conditions. It is therefore seen that the parts of the device are rigidly supported even when it is under conditions of no pressure.

The mode of assembly of the parts thus far described will now be set forth.

Link 37 is inserted upwardly through aperture 45 of bracket 43, and finger 23 of lever 15 is inserted through aperture 39 of the link. Spring 35 is then fastened to link 37 and spring 29 is fastened to eye 27 of lever 15, and conical portion 13 of actuator 11 is at the same time being inserted in the depression provided therefor in lever 15, and creases 21 are brought into fulcruming engagement with knife edges 51.

It is now seen that initial upward movement of actuating pin 11, (from the position shown in Figure 1) in response to pressure in bellows 3, will pivot lever 15 about knife edges 51 and cause the right-hand portion thereof to move downwardly or rock in a clockwise direction. This initial movement is in opposition to the tension of spring 29 and moves the right-hand end of lever 15 out of contact with finger 47. Link 37, however, will be held in abutment with bracket 43 by reason of the tension exerted by spring 35. As the lever 15 pivots farther in a clockwise direction, finger 23 thereof will contact the lower wall of aperture 39 in link 37 and thus carry the latter downwardly synchronously with the right-hand portion of lever 15. After the contact of finger 23 of lever 15 with link 37 has been made, it is therefore obvious that the force pushing lever 15 upwardly on the left-hand side of knife edges 51 will be opposed by the combined tension of springs 29 and 35.

In like manner, when the force against the portion of lever 15 on the left-hand side of knife edges 51 is reduced, in response to a reduction of the pressure in bellows 3, the right-hand portion of lever 15 and link 37 will move upwardly as a unit under the combined influence of springs 29 and 35 until the ears 41 of link 37 again abut the extending portion of bracket 43. Further upward movement of the right-hand end of lever 15 will involve only spring 29. It is obvious then that the final upward movement and the initial downward movement of pin 11 will have both springs 29 and 35 working together, whereas initial upward movement and final downward movement of the pin will only be opposed and aided by spring 29.

Tongue 17 of lever 15 is provided with two apertures for the insertion of rivets 53. Rivets 53 are projected through apertures provided therefor in the lower portion of a strip-like member 55, thereby rigidly securing the latter to tongue 17. Member 55 is preferably made of electric insulative material and has substantially at its mid portion a raised portion 57. The raised portion of member 55 is provided with apertures through which are inserted a screw 59 and a rivet 60 which are adapted to secure a flexible blade 61 thereto. Blade 61 is a long thin resilient metal strip of good magnetic, electrical conductive properties and has a reduced section at its center portion, to give it resiliency, and a contact 63 at its upper portion. If desired, however, blade 61 may be constructed of a non-magnetic material and carry a magnetic armature.

Figure 3:
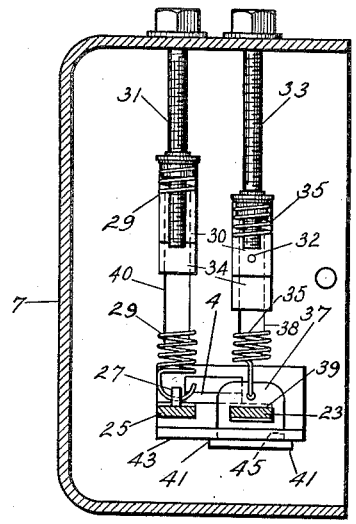
Figure 3 is a sectional view taken substantially along the line 3—3 of Figure 1, looking in the direction of the arrows.
Figure 4:
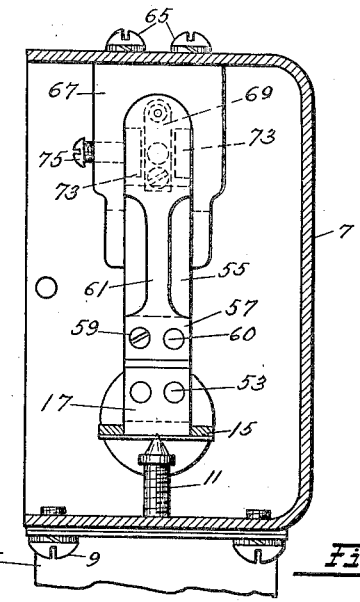
Figure 4 is a sectional view taken substantially along the line 4—4 of Figure 1, looking in the direction of the arrows.

Attached to the upper side of box 7, by means of screws 65, is a depending lug 67 of insulative material. On the side of the lug adjacent blade 61 there is attached, by suitable means such as screws 62, an upstanding metal strip or contactor finger 69 bent outwardly and having at its upper portion a contact 71. Contact 71 is adapted to cooperate with and conform to contact 63. Inserted through an aperture in lug 67, and at a point below contact 71, is a preferably permanent magnet 73 of horse-shoe shape adjustably secured in lug 67 by means of adjusting screw 75. The legs of magnet 73 straddle metal strip 69 as seen in Figure 4.

Attached to the left-hand side of box 7 (Figure 1) by means of screws 77 is a second rectangular insulating member 78 provided with suitable electric binding posts 79 and 81. At the lower portion of box 7 an aperture is provided through which lead wires 83 may be inserted and the ends thereof attached to the binding posts. Binding post 79 is electrically connected to contact 71 by means of a wire 85 connecting binding post 79 with one of screws 62 and thence to metal strip 69. Binding post 81 is electrically connected to contact 63 by means of a wire 84 leading from the binding post to screw 59 of blade 61. In this manner then it is seen that when contacts 63 and 71 are together a circuit is completed between the lead wires but when the contacts are separated, the circuit is broken.

A shallow cover 87 is provided on the front side of box 7 and is removably secured thereto by means of screws 89, which are threaded into the sides of the box.

In describing the operation of my invention, for the purpose of convenience I will assume that the device is to be employed in a steam heating system which requires that the steam pressure be kept within a range of three to five pounds per square inch. When this condition is decided upon, the operator or person making the installation adjusts screw 31 so that indicator 34 will register with the numeral 3 adjacent slot 40, indicating the pressure at which the heat-producing mechanism will restart or, cut-in pressure. He then adjusts screw 33 so that the other indicator 34 will register with the numeral 2 adjacent slot 38, indicating the pressure differential. The sum of the cut-in pressure and the differential is the pressure at which the heat-producing mechanism will shut down, and in this instance it is five pounds per square inch. These settings are preferably made when there is no pressure within the boiler.

It is to be understood that in the illustrated embodiment of the invention, wires 83 are connected with the boiler heat-producing mechanism so that when the contacts 63 and 71 are together the heat-producing mechanism will operate, and when the contacts are open the heat-producing mechanism will be shut down.

In the position shown in Figure 1 the contacts are closed, thus permitting operation of the heat-producing mechanism if the room thermostat is calling for heat. As steam is initially generated, actuating pin 11 will exert pressure against the left-hand portion of lever 15, and as before described, the right-hand portion will start to move downwardly. This movement of lever 15 will, of course, cause member 55 to move with it in a clockwise direction and will also cause blade 61 to tend to break the contacts 63 and 71. Magnet 73 is, however, exerting a force which holds the contacts together, the strength of this force depending upon the clearance between the magnet and the blade. This clearance may be adjusted by loosening screw 75 and moving the magnet toward or away from the blade as desired. If desired blade 61 may be allowed to directly contact the poles of the magnet.

The mechanism and springs are so designed and calibrated that when three pounds of steam pressure has been generated, finger 23 of lever 15 will have moved downwardly substantially to the lower wall of aperture 39 in link 37. At this point blade 61 has started to flex or bend and the upper end of member 55 approaches blade 61, due to the clockwise movement of its lower portion and the holding force of magnet 73 on its upper portion, but the resistance to flexing at this time is not sufficient to overcome the holding force.

As the pressure approaches five pounds, under the steam generating operation just described, member 55 will initially contact and exert pressure against the rear face of blade 61, so that the holding force of the magnet is almost overcome. When the pressure has reached five pounds, lever 15 and link 37 will have been moved into such position as to exert just that amount of added pressure by member 55 against blade 61 which is necessary to overcome the force of the magnet holding contacts 63 and 71 together. The moment the magnetic force is overcome, the resiliency of the metal of blade 61 will cause it to promptly straighten, thereby swinging contact 63 a substantial distance away from contact 71. In this manner then it is seen that a clean break in the circuit is obtained or, in the trade vernacular, the switch possesses a "snap action" form of operation. There can be no fluttering action of this switch, for, as above described, the contact 63 is far removed from the field of the magnet and a substantial return movement of lever 15 in a counterclockwise direction is required to bring blade 61 again into the magnetic field. With the contact thus broken, the heat-producing mechanism is shut off, whereupon substantially immediately, the steam pressure will start to decrease.

As the pressure decreases, actuating pin 11 will recede, thereby permitting lever 15 to oscillate in a counterclockwise direction about knife edges 51. From five down to say a point a few ounces above three pounds pressure both lever 15 and link 37 will move as a unit. When this point is attained ear 41 of link 37 will contact the lower face of bracket 43, and thereafter lever 15 will be returned solely under the action of spring 29. Blade 61 will accordingly move in a counterclockwise direction and will be brought within the field of magnet 73, but not sufficiently to cause the upper end thereof to flex toward contact 71. When three pounds pressure is reached, blade 61 will have moved sufficiently so that the field of magnet 73 is enabled to flex blade 61 and pull contact 63 into engagement with contact 71.

In this manner then it is seen that when steam is being generated the contacts 63 and 71 will remain closed during the period when the pressure is being increased up to five pounds. When the pressure reaches five pounds, the contacts will separate and will not again come together until the steam pressure has receded to three pounds. The cycle of operation is, of course, continuously repeated. From this description it is seen that spring 29 may be termed the "cut-in pressure spring" and spring 35 may be termed the "pressure differential spring", and that they both act together in the upper portion of the range to predetermine the "cut-out" pressure.

In connection with the operation of my device with the parts adjusted as previously described, i. e., to make the circuit or "cut-in" at three pounds and to break the circuit or "cut-out" at five pounds, it is to be observed that throughout this range springs 29 and 35 act concurrently during the upper portion of the range and that during the lower portion of the range, only spring 29 acts upon lever 15. Two springs, with a "pick-up" arrangement are used in this device in order that both the "cut-in" and "cut-out" pressures may be readily adjusted. It is therefore to be understood that if it is desired to embody the novel features of the other parts of my device in a fixed "cut-in" or "cut-out" pressure device, spring 29 or 35 may be omitted, and the appended claims are intended to embrace my invention when it assumes this form.

It will be appreciated that if a single spring were used to oppose movement of lever 15 in response to pressure, blade 61 would function to break the circuit at a higher pressure than it would make the circuit, by reason of the magnet holding the blade until it was contacted by the upper end of member 55, in the same manner as described in connection with the device shown in Figures 1 to 5, inclusive. In such device, however, adjusting the tension of the spring to give a higher or lower cut-out pressure would likewise change the cut-in pressure and would therefore tend to maintain a constant pressure differential.

It is therefore apparent that by providing two springs, and holding one of them in check over the lower portion of the differential range, I am able to adjust either the cut-in pressure or the cut-out pressure without disturbing the other pressure adjustment. For instance, if it is desired to change the cut-out pressure of the present device from five pounds to say seven pounds, screw 33 is turned in the proper direction to bring differential pointer or finger 34 into registry with differential numeral 4 on the side of the box. Therefore, the total reading will be four pounds differential plus three pounds cut-in pressure (the latter was not disturbed during the adjustment). With the device adjusted as just described, the pressure increases until seven pounds is attained, whereupon blade 61 will snap free from magnet 73 and break the circuit in the manner previously described. When the pressure starts to decrease, lever 15 will rock clockwise under the combined influences of springs 29 and 35 until ears 41 of link 37 contact bracket 43. Thereafter lever 15 will rock toward retracted position under the sole influence of spring 29, and when blade 61 attains the predetermined position before described, magnet 73 will snap it into engagement with, and make the circuit between contacts 63 and 71. As this return or retracting operation just described was, at the time of engagement of contacts 63 and 71, solely under the action of cut-in spring 29, it is apparent that the cut-in pressure was the same as before, namely, three pounds, for which the device was initially set. The re-adjustment of spring 35 to give a cut-out pressure of seven pounds (or a differential pressure of four pounds) accordingly did not affect the previously adjusted cut-in pressure of the device.

Although I prefer to employ two springs in order to provide for independent cut-in and differential pressure adjustments, it is to be understood that this result could be effected with a single spring if suitable means were employed to compensate for cut-out pressure adjustments. For instance, blade 61 may be adjusted as to resilience and/or angularity, or arm 55 may be made angularly adjustable with respect to lever 15 if desired. Moreover, I have shown and prefer to use tension springs in my device, but it is to be understood that compression springs may be used if desired without departing from the spirit of my invention.

I employ a permanent magnet in my device as it is simple and has proven to be highly satisfactory, but it is to be understood that if desired it may be used as, or substituted by an electromagnet connected in series with the circuit established by contacts 63 and 71, or be energized by a separate circuit, and those of the appended claims which employ the term "magnet" or "magnetic" are intended to embrace my invention when it is embodied in this form. Moreover, if desired, two insulated contacts may be mounted on blade 61 for cooperation with two contacts on block 67 and may be used instead of employing blade 61 as a conductor, without departing from the spirit of my invention.

Referring now to the modification illustrated in Figures 6, 7, and 8, the essential difference between this form and that previously described is that two pressure plates or levers 15a and 15b are employed. Lever 15a may be made from a flat sheet of metal and has an upwardly turned tongue 17a substantially at its midportion, opposite lugs 19a at its sides having creases 21a therein, an upwardly turned lip 91 at one end thereof having an aperture therethrough for the insertion of one end of a spring 29a, and at its other end a downwardly turned central portion 93. Lever 15b is very similar to lever 15a and has at one end thereof an upwardly turned lip 95 having an aperture therethrough for the insertion of one end of spring 35a. Lever 15b is also provided with opposite lugs 19b having creases 21b therein, and two spaced downwardly bent legs 97 at its other end, straddling the center portion. Legs 97 are longer than the downwardly bent portion 93 of lever 15a. Bracket 49a instead of having a single set of knife edges 51 as has bracket 49, carries two sets of knife edges 51a and 51b. The box 7a in place of having two slots 38 and 40 in one side thereof, as has box 7, is equipped with one slot in each of two opposite sides, and they are calibrated in much the same manner as box 7 of the preferred form of Figure 1. The remainder of the mechanism of the modified form is identical with that shown in Figure 1, with the exception of the location of terminal block 78a, which extends rearwardly and is secured to the back wall of the box, and need not be further described.

Assuming the same conditions as assumed for the preferred form, that is, cut-in and differential pressures of three and two pounds respectively; as the steam pressure increases and attains three pounds, the actuating pin 11 will move upwardly causing lever 15a to move about knife edges 51a in a clockwise direction. At pressures less than three pounds, for instance when initially starting the boiler, spring 29a will hold lever 15a with portion 93 thereof in engagement with the bottom of box 7a. When the pressure has reached a pressure very slightly in excess of three pounds, the left-hand portion of lever 15a will contact the right-hand portion of lever 15b. In order to definitely locate the point of contact of levers 15a and 15b, lever 15b is provided with a pressed out portion 99, which is adapted to be engaged by the upper surface of lever 15a. Thereafter, upward movement of pin 11 will produce counter-clockwise movement of lever 15b about knife edges 51b and simultaneous further clockwise movement of lever 15a. When five pounds pressure has been reached, the movement will have progressed to such an extent that the member 55 exerts sufficient force upon flexed blade 61 to overcome the force of magnet 73 and contacts 63 and 71 will be separated, thereby breaking the circuit in the manner described in connection with the first form of my invention.

As in the case of the preferred form, when the pressure diminishes, in response to the boiler cooling off, lever 15b will move in a clockwise direction about knife edges 51b and lever 15a will simultaneously move in a counter-clockwise direction about knife edges 51a until the pressure diminishes to a value very slightly in excess of three pounds. At this point lugs 97 of member 15b will come into contact with the lower inside face of box 7a. When the pressure attains three pounds, lever 15a, now moving under the sole influence of spring 29a, will bring blade 61 into such a position that the magnetic force of magnet 73 will flex the blade 61 and pull contact 63 into engagement with contact 71 and make the circuit, as previously described.

Either of the forms of the invention will operate satisfactorily, but that shown in Figure 1 is preferred for the reason that there are fewer parts and the arrangement is more compact. However, they both function in substantially the same manner and the appended claims are intended to embrace both forms.

From the above detailed description, it is evident that control devices made in accordance with my invention incorporate very few parts, are economical to manufacture, are sensitive and positive in action without sacrificing ruggedness, and are adjustable to varying pressure differentials.

It is also evident that when a contact is made or broken, substantial movement of the operating mechanism is required before the contact can be broken or made again. In this manner the fluttering action of prior devices is eliminated.

In Figure 9 I have illustrated a modified form of contactor blade assembly and it is shown as being applied to the device illustrated in Figures 1 to 5 of the drawings. In this form of the invention finger 17a of lever 15 is shown as being disposed to the left of actuating pin 13. Blade 61 is secured to arm 55 in the same manner described in connection with the first forms of the invention but in this instance rivet 60 and screw 59 also function to secure a stop plate 101 to arm 55. Plate 101 is bent outwardly from arm 55 and is provided at its upper end with an angular stop portion 102 which is adapted to cooperate with the rear face of blade 61.

With the parts disposed as shown in Figure 9, the contacts are engaged or "closed", and blade 61 is held away from plate 101 by the magnet. When the parts are brought into breaking position, under the influence of actuating pin 13, arm 55 engages blade 61 in the manner previously described and frees it from the holding influence of the magnet. Upon being freed, blade 61 springs away from the magnet and engages portion 102 of stop plate 101. Stop plate 101 therefore functions to prevent blade 61 from springing into contact with some other part of the device and also operates to prevent the blade from vibrating.

Although I find my device to be of particular value in pressure controlling organizations, it is to be understood that if desired it may be designed to respond to temperature variations instead of pressure variations without departing from the spirit of my invention. For instance, bellows 3 may be filled with a temperature responsive fluid, or actuator 11 directly connected to any other type of temperature responsive mechanism, such as a bi-metallic strip, so as to advance and retract the actuator in response to temperature changes. Moreover, the illustrated device is operable to break a circuit when the pressure attains a predetermined maximum, but if desired the parts may be reversed, so as to break the circuit when the minimum is reached. For instance, arm 55 and blade 61 may be reversed, and magnet 73 and contact 71 located on the right-hand side of the box if it is desired to achieve this result.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:—

1. In a control device, in subcombination, a lever mounted for rocking movement under the influence of an actuating element, resilient means connected to said lever and urging it in one direction against the action of said actuating element; stop means for limiting movement of said lever under the influence of said resilient means; an apertured member associated with said parts and through which said lever extends with a predetermined degree of lost motion; a spring connected to said member and urging it in such a direction as to oppose the action of said actuating element when said lost motion is taken up; and means for preventing said lost motion from being taken up when said lever is under the influence of said stop means.

2. The control device described in claim 1, wherein said last-named means comprises inter-engaging portions provided on said stop means and said apertured member.

3. In a control device, a pair of spring urged levers mounted for independent rocking movement, one of said levers cooperating with an actuating element, means for limiting movement of said levers under the influence of their springs, said one lever being operable to pick up and produce movement of said other lever when it has moved a predetermined distance against the action of its spring.

4. In a control device, an actuating member mounted for movement into a plurality of positions, a contactor mounted in a normally stationary position, a second contactor having means for yieldingly connecting it to said member, said second contactor being adapted to be engaged with and disengaged from said first contactor when said member moves from one position into a second position, magnetic means associated with said member and contactors and operable to maintain the latter in engagement when said member is disposed in said one position, said magnetic means and said first-named means being operable to maintain said contactors in engagement when said member has moved a considerable distance from said one position toward said second position, and abutment means carried by said actuating member and operable to engage and minimize vibration of said second contactor when it is disengaged from said first contactor in response to movement of said member into said second position.

FRANK O. COLE.